United States Patent [19]

Hartfiel et al.

[11] Patent Number: 4,911,192
[45] Date of Patent: Mar. 27, 1990

[54] METHOD OF AND APPARATUS FOR CONTROL OF SAFTEY VALVES

[76] Inventors: Johannes Hartfiel, Neueichwaldstrasse 5, 6800 Mannheim 31; Manfred Schmitt, Johann-Casimier-Str. 17, 6701 Friedelsheim, both of Fed. Rep. of Germany

[21] Appl. No.: 221,458

[22] PCT Filed: Oct. 1, 1987

[86] PCT No.: PCT/DE87/00446

§ 371 Date: Jun. 3, 1988

§ 102(e) Date: Jun. 3, 1988

[87] PCT Pub. No.: WO88/02510

PCT Pub. Date: Apr. 7, 1988

[30] Foreign Application Priority Data

Oct. 4, 1986 [DE] Fed. Rep. of Germany ....... 3633851

[51] Int. Cl.$^4$ ............................................. G05D 16/00
[52] U.S. Cl. .................................... 137/14; 137/487.5; 137/624.11
[58] Field of Search ........... 137/487.5, 624.11, 624.15, 137/624.13, 14

[56] References Cited

U.S. PATENT DOCUMENTS

| 3,665,945 | 5/1972 | Ottenstein | 137/14 |
| 4,550,747 | 11/1985 | Woodworth | 137/487.5 |
| 4,694,390 | 9/1987 | Lee | 137/487.5 X |
| 4,720,807 | 1/1988 | Ferran | 137/487.5 X |

FOREIGN PATENT DOCUMENTS 3124904 5/1982 Fed. Rep. of Germany .

Primary Examiner—Alan Cohan
Attorney, Agent, or Firm—Michael J. Striker

[57] ABSTRACT

A method of and apparatus for controlling a system safety valve comprising an operating cylinder for displacing a valve closing member, and in which outflow and inflow solenoid valves communicating with the operating cylinder for guiding hydraulic fluid out of and into the operating cylinder, respectively, are electronically controlled in accordance with the system pressure to enable stepwise opening or closing of the safety valve.

17 Claims, 2 Drawing Sheets

METHOD OF AND APPARATUS FOR CONTROL OF SAFTEY VALVES

BACKGROUND OF THE INVENTION

The invention is directed to a method of and an apparatus for control of safety valves in which a closing member is pressed against a valve seat against pressure of a medium under an action of an operating cylinder connected to a hydraulic control circuit, and in which, in order to achieve a valve opening lift, one or more outflow pressure sensor controlled solenoid valves open to enable a hydraulic fluid flow from the operating cylinder when the set pressure is reached. The solenoid valves close again when the pressure falls below the set pressure, whereby hydraulic fluid is supplied to the operating cylinder to effect valve closing.

In a known control method of this kind for safety valves, the operating cylinder constantly communicates with the pressure line of the hydraulic control circuit via a throttle. When the set pressure is reached, pressure switches open the outflow solenoid valves and keep them open until the medium pressure falls below a switching threshold of the pressure switches. Because of the continuously available load pressure, hydraulic fluid flows into the operating cylinder after the closing of the solenoid valves and closes the safety valve again.

A disadvantage in this known control device is that solenoid valves which are arranged in a redundant manner must have a valve opening area adapted to the highest pressure rise speed of the medium. Therefore, when the pressure rise is very slow, an excessive quantity of the medium to be secured is guided out and excessive pressure drop in the medium and high medium losses can accordingly occur. These pressure surges run through the pipeline as a pressure wave and lead to shaking of the safety valve and the pipeline. The pressure waves can also reach the pressure switches, so that the safety valve then continuously opens and closes in an undesired manner. In this known control device, the opening and closing of the safety valve is effected in accordance with an opening speed determined by the hydraulic system, and it is not possible in this case to adapt to an another opening and closing characteristic. Since the hydraulic pressure is continuously available at the operating cylinder via the throttle, the safety valve is closed again after every closure of the outflow solenoid valves, and permanent intermediate positions of the valve closing member are not possible. Therefore, this safety valve must continuously open and close when partial quantities are guided out.

SUMMARY OF THE INVENTION

It is the object of the present invention to provide a method of and an apparatus for controlling safety valves in which the safety valve quickly guides out large quantities of medium at high pressure rise speeds in cases of danger, but which opens only wide enough and long enough during a slow pressure rise as required to guide out a small quantity of medium necessary for compensating the slight pressure rise. Opening and closing behavior of the safety valve is adaptable to respective conditions of the system at all times.

In order that characteristic lines for the stroke of the valve closing member which are adapted for the widest range of system conditions be prepared, electronically stored and converted into stroke steps in a computer, one and the same safety valve can be used for the widest range of systems merely by inputting other stroke characteristic lines. Since the medium pressure is measured in short intervals, the smallest change in pressure can be recognized in the computer, and this change in pressure can be used to guide out the smallest quantities of hydraulic fluid, so that the valve opening process can be effected in many small partial opening steps. If, in so doing, the pressure change speed approximates zero, the safety valve remains in the achieved lift position and continuously guides out the excess quantity. By this sensitive adaptation, which is achieved by stepwise opening or closing of the safety valve, pressure surges, such as occur in known valves because of an excessively large opening lift, are safely avoided.

Since the computer calculates respective stroke steps of the valve closing member in accordance with the stored characteristic lines from the system pressure and the pressure change speed for each cycle, the valve behavior can be adjusted to the system conditions in a simple manner and can be adapted to the changed system conditions at any time by changing the characteristic lines without taking the valve device out of operation.

Moreover, the quantity of hydraulic fluid to be guided out of the operating cylinder or the quantity of hydraulic fluid to be supplied to the operating cylinder is calculated in the computer for each cycle and the electric opening pulses of the solenoid valves for each cycle are determined from it, wherein fast-response outflow solenoid valves and inflow solenoid valves, whose shortest response times are 2 ms, for example, are used for guiding out or supplying the smallest quantities of hydraulic fluid and accordingly for executing even the smallest stroke steps of the valve closing member. With these short response times of the solenoid valves, the inquiry and computer cycle times can likewise be selected so as to be very brief, so that a sensitive adaptation to the changing pressure conditions of the system to be secured can be effected at any time. The opening pusles determined for each cycle are supplied to the outflow or inflow solenoid valves via an amplifier, and the outflow and inflow solenoid valves then remain open for the duration of the calculated opening time and, accordingly, control opening or closing process of the safety valve in aggreement with the input characteristic lines in small stroke steps at low pressure change speeds and in large stroke steps at high pressure change speeds. On the other hand, at very high pressure change speeds, opening or closing process is effected in a single stroke step until the end lift position.

The control method according to the invention can also be applied to safety stop valves in which the valve closing member is in the open position at a pressure below the set pressure and is moved into the closed position by draining the hydraulic fluid from the operating cylinder in a stepwise manner when the set pressure is exceeded.

The input characteristic line or lines lie in a pressure range provided between a lower set pressure $P_u$ and an upper set pressure $P_0$, and the computer carries out the calculation of the opening pulses for the fast-response solenoid valves cyclically only in this pressure range. Since the safety valve reacts to the smallest changes in pressure because of the proposed control, and the valve closing member can also remain in any intermediate position if the discharged quantity of medium of the pressure system to be secured is large enough to keep the pressure constant, the pressure range between $P_0$ and $P_u$ can be kept small. Experience has shown that the pressure difference between $P_0$ and $P_u$ can amount to approximately 5% of the upper set pressure $P_0$ at higher set pressures. If the medium pressures are above the upper set pressure $P_0$ or below the lower set pressure $P_u$, the step control can remain inoperative. That is, when the upper set pressure $P_0$ is exceeded, the computer sends a permanent opening signal, rather than the opening pulses, to an amplifier acting on the outflow solenoid valves, and when the pressure falls below the set pressure $P_u$, it sends a permanent closing signal to the outflow solenoid valves.

The stepwise lift adjustment of the valve closing member which is effected as a function of the pressure change speed is no longer meaningful if the system pressure rises or falls extremely quickly. In this case, it is proposed that the opening pulses for the solenoid valves be calculated in the computer only until high limiting values of the pressure change speed are reached for the opening process of the safety valve, on one hand, and for the closing process of the safety valve, on the other hand. Therefore, when these limiting values are exceeded, a permanent opening signal for the outflow solenoid valves is sent to the controlling amplifier by the computer when the pressure is rising, and a permanent opening signal for the inflow solenoid valves is sent from the computer to the controlling amplifier when the pressure is falling. Accordingly, when the pressure increase is extremely fast, i.e. in the case of danger, the safety valve opens with the greatest possible speed. On the other hand, when the pressure drop is extremely high, an excessive quantity of medium is prevented from being lost.

A more sensitive response of the control at low pressure rise speeds and a faster response at higher pressure rise speeds is achieved, by providing fast-response solenoid valves with variable opening cross-sections. Accordingly, the quantity of hydraulic fluid which is to be guided out or supplied can be determined not only by opening time but also by the different opening cross-sections of the solenoid valves, so that the interval between the smallest and the greatest quantity of hydraulic fluid to be guided out or supplied, respectively, is substantially increased. The possible changes of the opening cross-sections of the solenoid valves employed are electronically stored, and the respective opening cross-sections of the solenoid valves are taken into consideration in the calculation of the opening pulses.

If the pilot-controlled solenoid valves are provided as fast-response solenoid valves, a respective open flow cross-section is automatically controlled by duration of the opening pulses. With short opening pulses, it is only a pilot cone having a small cross-section that opens, whereas with longer opening pulses, the large main cone cross-section is opened.

If it is desirable to further shorten the regulating times for the lift of the valve closing member, it is recommended to arrange a plurality of fast-response solenoid valves with identical or different opening cross-sections in parallel connection. When large quantities of hydraulic fluid are to be guided out or supplied, the solenoid valve which is connected in parallel, can be switched on so that the valve opening area is doubled or, with a plurality of solenoid valves, even further multiplied.

In order that the calculation of the opening pulses in the computer may be effected without error, it is further suggested to take the starting time and the drop-out time of the fast-response solenoid valves into consideration as a correction value in the calculation of the opening pulses. Since pressure and temperature changes in the hydraulic fluid can alter the starting and drop-out time of the solenoid valves, it is suggested to take these changes in the starting time and the drop-out time of the solenoid valves caused by pressure and temperature changes into consideration as correction values in the calculation of the opening pulses, also.

Since the pressure in the operating cylinder changes during the opening of the outflow solenoid valve or valves and the quantity of hydraulic fluid flowing through the outflow solenoid valves per unit of time is dependent on this operating cylinder pressure, it is suggested to measure the load pressure in the operating cylinder cyclically and to take it into consideration likewise in the calculation of the opening pulses for the outflow solenoid valves as a correction value.

During the opening of the inflow solenoid valves which trigger the closing process of the safety valve, both the load pressure in the operating cylinder and the pressure in the storage of the hydraulic control circuit change. The quantity of hydraulic fluid flowing through the inflow solenoid valves per unit of time depends not only on the flow cross-section but also on the difference between the storage pressure and the load pressure. Accordingly, the pressure difference between the pressure in the storage of the hydraulic control circuit and the load pressure in the operating cylinder is measured cyclically and is taken into consideration as a correction value in the calculation of the opening pulses of the inflow solenoid valve or valves.

Since the calculated lift steps of the valve closing member can diverge from the actual lift, it is suggested to measure a respective lift position of the safety valve cyclically as an actual value by a displacement pickup and to compare this actual value with the calculated lift steps. When differences occur, the calculated opening pulses are corrected accordingly, so that control errors caused by inexact lift steps are safely avoided.

Since the viscosity of the hydraulic fluid is dependent upon temperature, and the quantity of hydraulic fluid flowing through the solenoid valves per unit of time decreases as the viscosity increases, it is suggested to store the known temperature/viscosity characteristic line of the hydraulic fluid electronically and to measure the temperature of the hydraulic fluid cyclically. Accordingly, the viscosity, which changes with the temperature, and the flow resistance of the solenoid valves, which changes along with it, can be taken into consideration in the calculation of the opening pulses.

It is only meaningful to take the viscosity of the hydraulic fluid into consideration within a certain temperature range, since the lift adjustment of the safety valve proceeds too slowly at temperatures which are too low and the electric or electronic structural component parts of the control which enter into a heat conducting connection with the hydraulic fluid, e.g. the coils of the solenoid valves, may be damaged at excessive fluid temperatures. In order to prevent the safety valve from responding too slowly, on one hand, and to avoid damage to electric components, on the other hand, it is suggested, that heating means for heating the hydraulic fluid be switched on automatically when the temperature falls below a lower temperature limiting value of the hydraulic fluid, and that cooling means be switched on automatically when an upper temperature limiting value is exceeded. The hydraulic fluid can be heated in a simple manner. When the temperature falls below the lower temperature limiting value, the hydraulic pump of the hydraulic control circuit is switched on or remains switched on, respectively, until the hydraulic fluid has been sufficiently heated by power losses of the hydraulic system which are converted into a thermal energy.

The electronic device provided for the control of the safety valve also makes it possible to increase the operating reliability of the safety valve by monitoring the most important constructional components and promptly reporting disturbances. For this purpose, it is suggested to measure cyclically the state variables at least of the electric, electronic and hydraulic structural component parts which are important for operation, and to compare them with electronically stored limiting values in the computer. When limiting values are exceeded, the computer emits corresponding disturbance signals so that the cause of the disturbance is promptly overcome and possible damage can be avoided.

An preferable arrangement for implementing the aforementioned control process consists in arranging the outflow and inflow solenoid valves directly at the operating cylinder or in the immediate vicinity of the same and in connecting the supply vessel or reservoir and the storage of the hydraulic control circuit directly thereto. As a result, a small quantity of hydraulic fluid remaining in short lines upon switching the fast-response solenoid valves, can be accelerated to a desired flow speed in a short time, so that short regulating times for the valve lifts results. A neat grouping of the entire system results by including all electronic structural components, such as computer, storage, amplifier and the like, in an electronic constructional unit which is connected to the solenoid valves, on one hand, and to the pressure sensors on the other hand.

A very high operational dependability of the control apparatus is achieved arranging three pressure sensors which work independently from one another and cooperate with solenoid valves which are arranged in a redundant manner. The control of the lift steps is effected by a outflow solenoid valve in the pressure range between the lower set pressure Pu and the upper set pressure P0, while the two other outflow solenoid valves, which are controlled directly by the pressure switches are controlled only when the upper set pressure P0 is exceeded. Accordingly, a reliable opening of the safety valve is also ensured during outage of the electrical control.

All hydraulic structural component parts are preferably installed, using the minimum space, in a cup-like housing which simultaneously forms the supply vessel for the hydraulic fluid. The shortest line connections between the individual hydraulic structural component parts is obtained by this arrangement, and the structural component parts are protected against mechanical external influences by the cup housing. An explosion-proof construction is effected in a simple manner in that an electrically nonconductive hydraulic oil, used as supply oil, flows around all electrical parts of the hydraulic control circuit installed in the supply vessel. Accordingly, the parts located in the oil are simultaneously protected against overheating.

Because of the compact construction, the supply vessel containing the hydraulic parts can be placed on the operating cylinder in a simple manner so that the shortest connection paths from the hydraulic control circuit to the operating cylinder can be created, and the system is particularly compact. The surface of the hydraulic housing, which gives off heat, is substantially enlarged by cooling ribs so that a high power loss can be quickly dissipated into the environment. If two storages connected in parallel are provided in the hydraulic control circuit, a perfect control operation of the solenoid valves is still ensured during the outage of one storage, and the two storages can be accommodated within a small space in the central housing.

Figure 1:
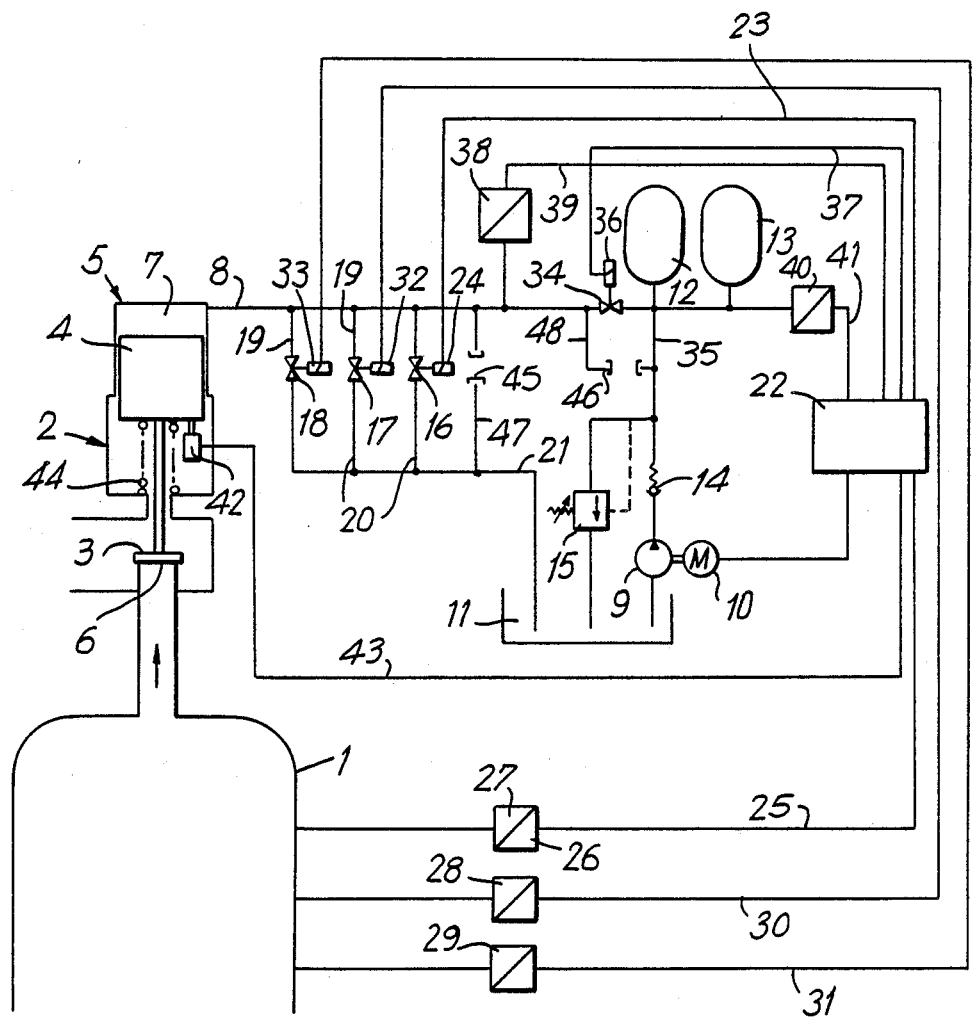
FIG. 1 shows a block diagram of the control apparatus according to the invention.

In the block diagram shown in FIG. 1, the system 1 to be controlled is provided with a safety valve 2 whose valve closing member 3 is pressed against a valve seat 6 by piston 4 of a hydraulic operating cylinder 5 which holds the safety valve 2 in a closed position. A load chamber 7 of the operating cylinder 5 is connected via a hydraulic line 8 to a hydraulic control circuit which, in its basic construction, consists of a hydraulic pump 9 with a motor 10, an oil supply vessel 11, and two storages 12 and 13 connected in parallel. Moreover, a check valve 14 and a pressure relief valve 15 are provided in the hydraulic control circuit.

The hydraulic fluid is guided out of the load chamber 7 of the operating cylinder 5 via three outflow solenoid valves 16, 17, 18 which are located parallel to one another and are connected to the hydraulic line 8 on the input side via a branch lines 19 and to an outflow line 21 leading to the oil supply vessel 11 on the output side via a branch lines 20. The outflow solenoid valve 16 is controlled by an electronic control unit 22 which transmits opening pulses to an electric switching part 24 or the magnet coil of the outflow solenoid valve 16, respectively, via a control line 23. On the input side, the electronic control unit 22 is connected via an instrument lead 25 with the electric signal output 26 of a pressure sensor 27 connected to the system 1. For reasons relating to safety, two additional pressure sensors 28 and 29, which are designed as pressure switches, are connected to the system 1 parallel to the pressure sensor 27 and are directly connected with magnet coils 32 and 33 of the other two outflow solenoid valves 17 and 18 via two control lines 30 and 31.

Whereas the three outflow solenoid valves 16, 17 and 18 are provided for the control of the opening process of the safety valve 2, the closing process of the safety valve 2 is controlled via the inflow solenoid valve 34, which is connected on the input side to the pressure line 35 of the hydraulic control circuit and on the output side to the hydraulic line 8 leading to the load chamber 7. The electric switching part 36 and the magnet coil of the inflow solenoid valve 34 are connected outward from the electronic control unit 22 via the control line 37.

All of the electronic structural components, such as the computer, storage, amplifier and the rest of the electronic modules, which are required for the control of the opening and closing process of the safety valve 2, are comprised in the electronic control unit 22, wherein the desired characteristic line or lines for the lift of the valve closing member which are determined by the medium pressure and the pressure change speed are input in the storage prior to putting the system in operation. According to the level of the medium pressure in the system 1 to be secured, the medium pressure being detected by the pressure sensor 27, the electronic control unit 22 calculates per cycle the pressure change speed and, in comparison with the stored characteristic line for each cycle, the dimension of the lift step of the valve closing member to be carried out. In order to carry out this lift step, the quantity of oil to be metered out of the load chamber 7 is determined in the electronic control unit 22 and the opening pulse to be transmitted to the outflow solenoid valve 16 is calculated from this. The safety valve 2 is accordingly controlled cyclically in a stepwise manner. The closing process of the safety valve 2 is likewise effected via the electronic control unit 22, but now through a stepwise control of the inflow solenoid valve 36.

In order to be able to take the load pressure in the operating cylinder into account as a correction value in the calculation of the opening pulses for the outflow solenoid valve 16, a pressure sensor 38, whose electric output is connected with the electronic control unit 22 via the instrument lead 39, is connected to the hydraulic line 8. An additional pressure and temperature sensor 40, whose electric output is connected with the electronic control unit via the instrument lead 41, is connected to the pressure line 35 of the hydraulic control circuit. By this pressure and temperature sensor 40, both the differential pressure at the inflow solenoid valve 34 and the temperature of the hydraulic oil can be taken into account as correction values in the calculation of the opening pulses. In order to correct calculation errors in the electronic control unit 22 during the determination of the stroke steps to be carried out, a control 42, whose electric output is connected with the electronic constructional unit 22 via the instrument lead 43, is also provided at the piston 4 of the operating cylinder 5.

The valve opening spring 44 is provided in the safety valve 2 so that the movable valve parts can be moved into the open position of the valve if the system 1 to be secured is in a pressureless state. The valve lift is controlled by means of the outflow solenoid valve 16 and the inflow solenoid valve 34. Only when the medium pressure increases above the upper set pressure $P_0$ do the two outflow solenoid valves 17 and 18, which are controlled directly by the pressure switches 28 and 29, also open. The installation connections 45 and 46 in the parallel lines 47 and 48 are provided in order that an additional outflow solenoid valve or an additional inflow solenoid valve can be installed.

Figure 2:
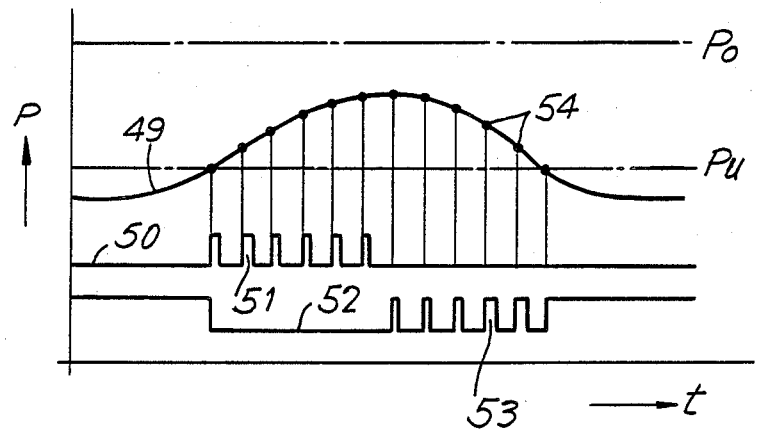
FIG. 2 shows a diagram showing stepwise opening or closing of a safety valve performed according to the invention.

The diagram shown in FIG. 2 shows the system pressure P as a function of the time t. The curve 49 shows the configuration of the system pressure within a determined period of time. The stepwise control of the valve opening lift and valve closing lift is effected in the pressure range between the lower set pressure $P_u$ and the upper set pressure $P_0$, wherein the characteristic line 50 shows the opening pulses 51 of the outflow solenoid valve and the characteristic line 52 shows the opening pulses 53 of the inflow solenoid valve. The spaces between the points 54 of the curve 49 denote the individual cycles in which the individual lift steps take place. According to the pressure curve 49 increasing in the left half of FIG. 2 when the lower set pressure $P_u$ is exceeded, the valve closing member 3 is raised in the steps 51 cyclically, so that medium is guided out to an increasing degree and the pressure rise speed in the system denoted by the slope of the curve 49 constantly decreases and finally passes into a horizontal configuration with zero pressure change speed. From this moment, opening pulses are no longer transmitted to the outflow solenoid valve, and the valve closing member 3 remains in the lift position last reached. If the disturbance which triggered the pressure increase in the system is eliminated, the system pressure falls, as can be seen by the right half of the pressure curve 49. The valve closing member is moved cyclically in a stepwise manner by means of the opening pulses 53 acting on the inflow solenoid valve until the pressure falls below the lower set pressure $P_u$ so that the safety valve closes slowly enough in this pressure range so that no pressure shocks occur, but, on the other hand, closes quickly enough so that no excessive medium losses need be tolerated. In this closed position of the valve, the inflow solenoid valve 34 remains in the permanent open position so that the hydraulic pressure is constantly available in the load chamber 7 of the operating cylinder 5.

Figure 3:
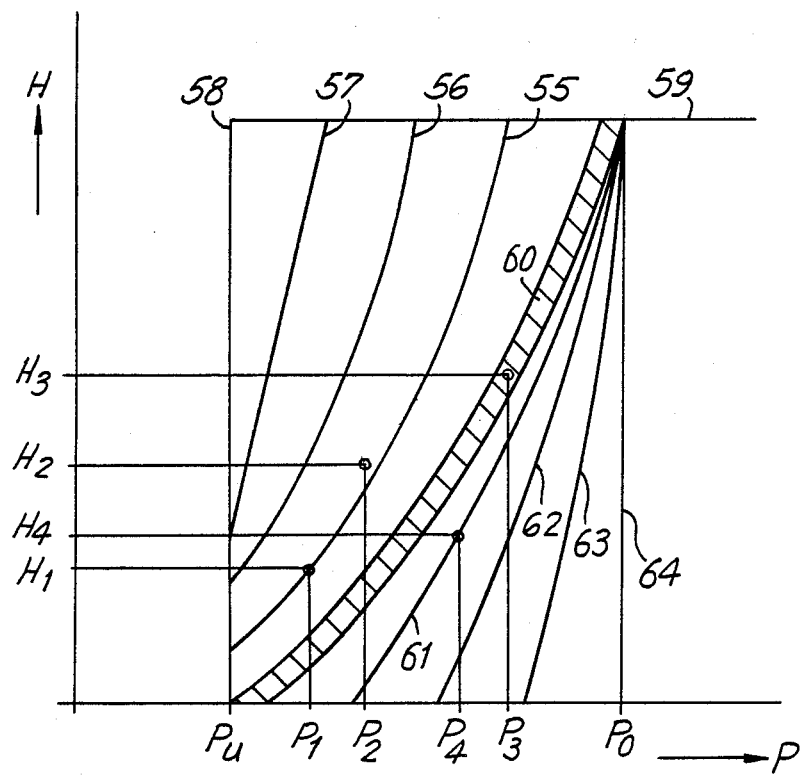
FIG. 3 shows a diagram with characteristic lines for various positive and negative pressure change speeds, the characteristic lines being prepared as a function of a system pressure.

FIG. 3 shows an example of the characteristic lines to be input in the electronic storage for the lift H as a function of the system pressure P and simultaneously as a function of the pressure change speed of the system pressure. The pressure range in which the control of the safety valve is carried out in a stepwise manner lies between the lower set pressure $P_u$ and the upper set pressure $P_0$. The characteristic lines 55, 56, 57 and 58 show the desired dependency of the desired lift on the pressure rise speed and on the system pressure P. The horizontal characteristic line 59 for the lift denotes the end lift position of the safety valve. The characteristic line 55 represents a low pressure rise speed of e.g. 1%/s of the set pressure, while the characteristic line 58 shows the upper limiting value of the pressure rise speed of e.g. 5%/s or more of the set pressure. The characteristic lines 56 and 57 denote whole number intermediate values in the pressure rise speeds, wherein the remaining intermediate spaces between these characteristic lines can be divided more finely, as desired, by means of the characteristic lines lying between them. If, for example, the system pressure rises to pressure $P_1$ at the beginning of a desired cycle and the pressure rise speed according to characteristic line 55 amounts to approximately 1%/s, a desired lift $H_1$ results from the diagram. If, in the next cycle, the system pressure rises to the value $P_2$ and the pressure rise speed increases to a somewhat higher value between the two characteristic lines 55 and 56, a desired lift $H_2$ results so that, for this cycle, the lift step to be carried out results from the difference between the desired lift $H_2$ and the desired lift $H_1$. The middle hatched area 60 denotes very small pressure change speeds, for example, in the range of plus/minus 0.1%/s of the set pressure. In this range, only the system pressure P is made use of for determining the desired lift. If the system pressure increases to a value $P_3$, for example, and the pressure change speed lies in the hatched area 60, the desired lift $H_3$ results, so that a lift step resulting from the difference between $H_3$ and $H_2$ is to be carried out.

The characteristic lines 61, 62, 63 and 64 located on the other side of the hatched field 60 represent the negative pressure change speeds, i.e. for falling system pressure. The characteristic line 61 represents e.g. a pressure fall speed of 1%/s of the set pressure, while the characteristic lines 62 and 63 denote greater pressure fall speeds. The characteristic line 64 represents pressure fall speeds of 10%/s or more, for example. If the system pressure falls from $P_3$ to $P_4$ and the pressure fall speed is at the characteristic line 61, the desired lift $H_4$ results. The lift step to be carried out for this cycle is calculated from the difference $H_4$ minus $H_3$. The result is negative, which shows that a lift step is to be effected in the closing direction.

We claim:

1. A method of controlling safety valve means of a system, the safety valve means comprising a valve seat, a closing member, and an operating cylinder for displacing the closing member relative to the valve seat, the operating cylinder being connected to a hydraulic control circuit including at least one fast-response outflow solenoid valve and at least one fast-response inflow solenoid valve actuatable in accordance with a pressure of the system medium for guiding the hydraulic fluid out of and in the operating cylinder, respectively, to thereby control opening and closing of the safety valve means, said method comprising the steps of:

preparing, in accordance with system characteristics, at least one characteristic line for displacing the closing member as a function of a system medium pressure and a pressure change speed dp/dt;

storing the one characteristic line in a computer in form of one of points of the one characteristic line and coefficients of analytical functions;

measuring the system medium pressure in a short cycle time and storing obtaining data in the computer;

determining a pressure change speed in a cycle time and determining a dimension of a closing member stroke in accordance with the stored one characteristic line for effecting one of stepwise opening and closing of the safety valve means;

determining a quantity of the hydraulic fluid to be communicated through one of the outflow solenoid valve and the inflow solenoid valve per cycle to effect a respective stroke of the closing member;

determining electric opening pulses for actuation of the one of the outflow and inflow solenoid valves in accordance with the determined quantity of the hydraulic fluid;

amplifying the electric opening pulses; and communicating the amplified electric opening pulses to the one of the outflow and inflow solenoid valves, the one of the outflow and inflow solenoid valves controlling the one of the opening and closing of the safety valve means in small steps at a low pressure change speed, in large steps at a high pressure change speed, and in a single step at a very high pressure change speed until an end of the closing member stroke.

2. A method according to claims 1 wherein said step of communicating the amplified electric opening pulses to the one of the outflow and inflow solenoid valves includes communicating the electric opening pulses to the outflow solenoid valve to effect guiding hydraulic fluid out of the operating cylinder to provide for the opening of the safety valve means when the closing member is in its closing position at the system medium pressure being below a set value.

3. A method according to claim 1 wherein said step of communicating the amplified electric opening pulses to the one of the outflow and inflow solenoid valves includes communicating the the electric opening pulses to the outflow solenoid valve to effect guiding hydraulic fluid out of the operating cylinder to provide for the closing of the safety valve means when the closing member is in its open position at the system medium pressure being below a set value.

4. A method according to claim 2 wherein said step of preparing at least one characteristic line includes preparing the one characteristic line for a system medium pressure range between a lower set pressure ($P_u$) and an upper set pressure ($P_0$), said step of determining electric opening pulses including determining the electric opening pulses cyclically for the system medium pressure range and generating a permanent opening signal to be amplified and communicated to the outflow solenoid valve when the system medium pressure exceeds the upper set value, and generating a permanent closing signal to be amplified and communicated to the outflow solenoid valve when the system medium pressure drops below the lower set value.

5. A method according to claim 1 wherein said step of determining electric opening pulses includes determining the electric opening pulses until maximum limiting values of the pressure change speed has been reached, and generating a permanent opening signal to be amplified and communicated to the outflow solenoid valve when the maximum limiting values of the pressure change speed has been reached and the system medium pressure is rising, and to the inflow solenoid valve when the maximum limiting values of the pressure change speed has been reached and the system medium pressure is falling.

6. A method according to claim wherein the outflow and inflow solenoid valves have a variable cross-section, said method comprising the step of storing data related to the variable cross-sections of the outflow and inflow valve, said step of determining electric opening pulses including determining the electric opening pulses in accordance with the variable cross-section of the one of the outflow and inflow solenoid valves.

7. A method according to claim 6 wherein the outflow and inflow solenoid valves are pilot-controlled solenoid valves having a pilot cone with a small cross-section and a main cone with a larger cross-section, said step of determining electric opening pulses includes generating short opening pulses to provide for opening of the small cone and generating longer opening pulses to provide for opening of the large cone.

8. A method according to claim 6 comprising the step of providing at least additional one of outflow and inflow solenoid valves connected parallel to a respective one of the outflow and inflow valves and actuatable together with the respective one of the outflow and inflow solenoid valves to enable one of guiding out and guiding in of a large amount of hydraulic fluid.

9. A method according to claim 1 wherein each of the outflow and inflow solenoid valves has a starting time and a drop-out time, said step of determining electric opening pulses comprising the step of determining electric opening pulses in accordance with the starting time and drop-out time of the one of the outflow and inflow solenoid valves.

10. A method according to claim 9 wherein said step of determining electric opening pulses in accordance with the starting time and drop-out time includes determining the electric opening pulses in accordance with changes in the starting time and the drop-out time resulting from pressure and temperature changes of the hydraulic fluid.

11. A method according to claim 1 comprising the step of cyclically measuring a load pressure in the operating cylinder, said step of determining electric opening pulses for actuation of the one of the outflow and inflow solenoid valves including determining the electric opening pulses in accordance with the load pressure where the one of the outflow and inflow solenoid valves is the outflow solenoid valve.

12. A method according to claim 1 wherein the hydraulic control circuit comprises a storage for the hydraulic fluid, said method including the step of measuring a load pressure cyclically in the operating cylinder, the step of determining electric opening pulses for actuation of the one of the outflow and inflow solenoid valves including determining the electric opening pulses in accordance with a pressure difference between a storage pressure and the load pressure when the one of the outflow and inflow solenoid valves is the inflow solenoid valve.

13. A method according to claim 1 comprising the step of providing a displacement sensor for cyclically measuring a stroke position of the closing member which represents an actual value, and the step of comparing the actual value with the determined dimension of the closing member stroke, said step of determining electric opening pulses including correcting the electric opening pulses when a difference between the actual value and the determined dimension of the closing member stroke occurs.

14. A method according to claim 1 comprising the steps of storing a characteristic line of predetermined temperature and viscosity of the hydraulic fluid, cyclically determining a temperature of the hydraulic fluid, said step of determining the electric opening pulses including determining the electric opening pulses in accordance with changes in the hydraulic fluid temperature and, accordingly, in the hydraulic fluid viscosity.

15. A method according to claim 1 further comprising the step of providing means for heating the hydraulic fluid and means for cooling the hydraulic fluid, the heating means and the cooling means being, respectively, turned on automatically when hydraulic fluid temperature drops below a lower temperature limiting value and exceeds an upper temperature limiting value, respectively.

16. A method according to claim 15 wherein the hydraulic control circuit comprises a pump, said method including the step of turning on the pump and maintaining the pump turned on until the hydraulic fluid is heated to at least the lower temperature limiting value due to power losses of the system which power losses are converted into a thermal energy.

17. A method according to claim 1 comprising the step of cyclically measuring state variables of electric, electronic and hydraulic structural components important to operation of the safety valve means, comparing the measured state variables with respective stored state limiting values, and generating respective disturbance signals when the respective state limiting values are exceeded.

* * * * *